May 13, 1930. H. M. JAMPOL 1,757,965
COMBINATION BUNDLING AND DELIVERY TABLE
Filed Oct. 19, 1926
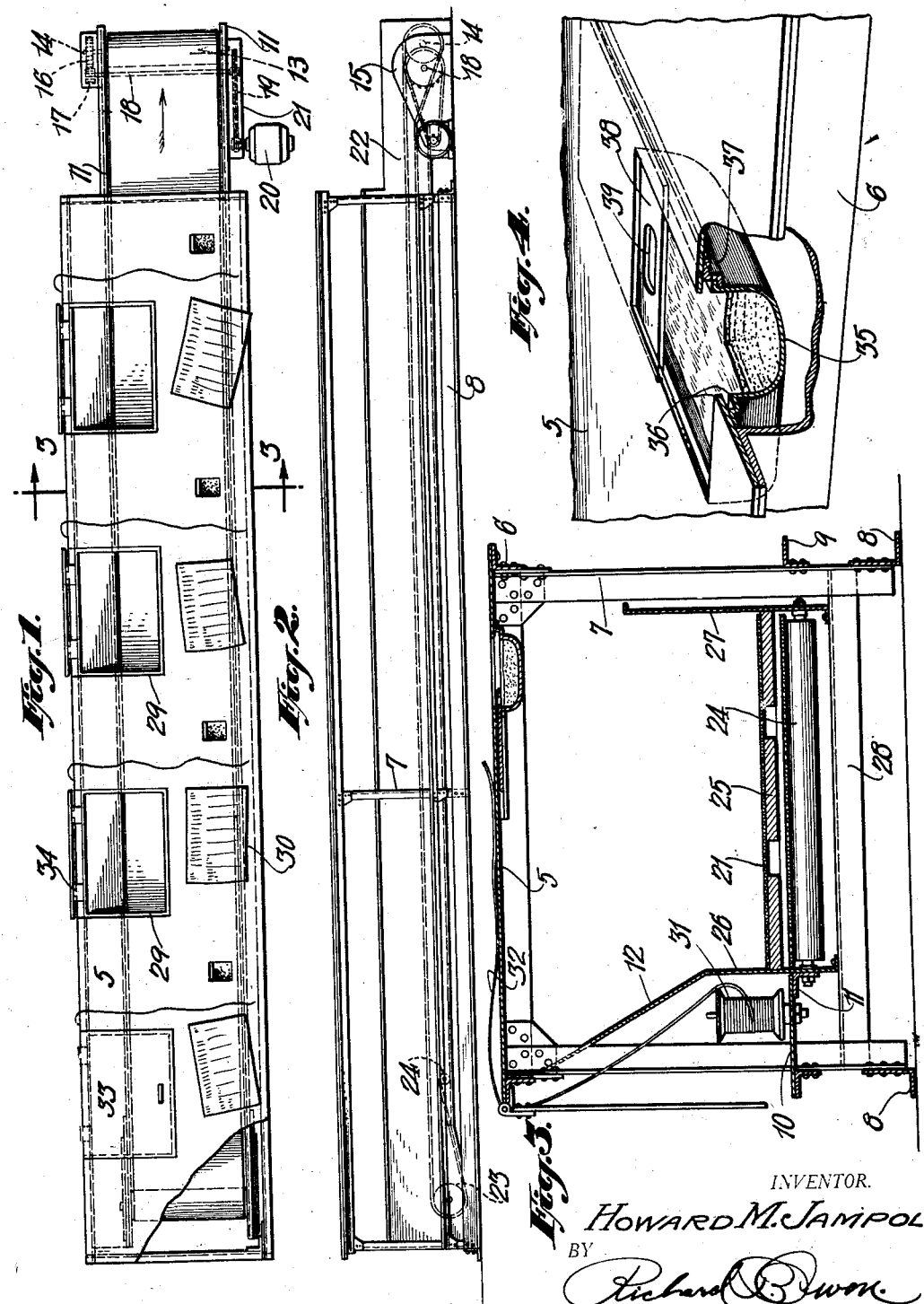
INVENTOR.
HOWARD M. JAMPOL
BY
ATTORNEY.

Patented May 13, 1930

1,757,965

UNITED STATES PATENT OFFICE

HOWARD M. JAMPOL, OF NEW YORK, N. Y.

COMBINATION BUNDLING AND DELIVERY TABLE

Application filed October 19, 1926. Serial No. 142,728.

This invention relates to delivery tables and in particular to one incorporating features whereby the bundling of packages, papers or other articles may be carried on directly at the delivery table.

A particular object of the invention is to provide, such, for instance, as in newspaper plants, a combination bundling and delivery table which will minimize the space necessary in the handling of bundles of papers and which will also reduce the amount of handling necessary and thereby save time and labor in the bundling of newspapers for delivery to distributors.

In the present day newspaper plant, it is the custom to deliver the papers to the basement or other places, adjacent the press through the medium of suitable slides, the papers sliding out on to a table and being there bundled up for the different distributors, after which the bundles are carried to a conveyor belt and placed thereon for delivery to the wagon loading platform.

In order to overcome this unnecessary amount of handling, I have constructed a bundling table having in the bottom thereof a conveyor belt and I have so arranged the table that the bundling can take place thereon and delivery to the conveyor belt will be immediate and without necessity of lifting the bundles by the employee engaged in tying the same up.

A primary object of the invention is the construction of a table top with a plurality of aligned spaced openings whereby the top of the table may be used for wrapping bundles and the openings utilized to immediately dispose of the bundles, particular attention being called to the fact that the width of the openings are considerably less than the width of the table thereby providing the required area of surface for supporting the bundles during the wrapping thereof, greater space being provided by closing one or more of the doors.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a top plan view of a bundling table, showing the conveyor belt associated therewith and forming a part thereof.

Figure 2 is a view in side elevation of the combination bundling and delivery table as seen in Figure 1.

Figure 3 is an enlarged, sectional elevation, the section being taken on the line 3—3 of Figure 1 and the view showing the construction of the parts of the table and the disposition of the conveyor belt therein, and Figure 4 is a fragmentary view in perspective of a glue pot or basin which is incorporated in the table top and which is used in the gluing of wrappers around papers which are to be delivered by mail.

Referring to the drawings in detail, 5 indicates the table top which is constructed of sheet metal, preferably, but which may be made of polished wood or other suitable material, the sheet metal being essential so that handling and moving the papers about on the table top will be facilitated. The table top 5 is secured in any suitable manner to the longitudinally disposed angle members 6 which, in turn, are secured to the upper end of the legs 7, any number of legs being provided depending upon the length of the table desired. The lower ends of the legs are secured to the longitudinally extending angle pieces 8, which form a base for the table and which prevent the feet of the employees from getting under the table. The legs of the table are also provided with the longitudinally, extending, intermediately disposed angle pieces 9, one of the pieces 9 forming a support at one side of the table for a spool holding shelf 10, which extends into and under the table to rest at its opposite side on a light angle iron 11, which is secured to the inclined apron 12, positioned beneath the table top and whose purpose will be hereinafter described.

The angle iron 11 may extend the entire length of the table and project therebeyond to provide a bearing for the conveyor operating roller 13, which, as shown in Figure 1 is mounted on a suitable shaft 14, which carries at one side of the roll and within a suitable housing 15, a driving gear 16, which is, in turn, operated by the driving pinion 17 carried on the end of a shaft 18 which is driven through the medium of a sprocket wheel and chain 19 from the motor 20. The sprocket wheel and chain may be encased within a suitable housing 21 to protect employees engaged about the table.

The conveyor belt 22 extends the length of the table and passes over the driving roll 13 beyond one end of the table and at the opposite end of the table, passes over the conveyor roll 23, suitable idler rolls being positioned as at 24 to take up the slack in the conveyor belt. The upper race of the conveyor belt is over a suitable flooring 25 which is secured in any manner between the vertical walls 26 and 27 forming a conveyor belt raceway. The lower race of the belt being of course carried over the idlers 24 as before referred to. Any suitable construction may be employed to support the conveyor belt and in this instance, I provide the angular cross pieces 28 which may be positioned at intervals throughout the length of the table and it may be carried by either the angle irons 8 or by the legs of the table themselves, it being immaterial from what point the cross pieces 28 are supported, but it being essential that they be so positioned that they support the side walls 26 and 27, the former of which is provided with a diagonally disposed portion, which constitutes an apron 12, hereinbefore referred to. This apron 12 extends, as does the side wall 26, the entire length of the table. This is also the case with the side wall 27 and the side walls 26 and 27 form a guideway for the bundles as they are carried by the conveyor belt 22 through the table to be subsequently emptied on to the wagon loading platform.

The purpose of the apron 12 which, by the way, is made of metal, as are most of the parts, of the table, is to receive papers or bundles of papers that have been projected through the openings 29 formed in the table top 5, these openings being spaced and being provided so that each employee upon bundling the papers 30, as shown in Figure 1, may project the bundle through the opening 29, whereby it will strike the apron 12 and be deflected off on to the belt 21 to be thence conveyed to the wagon loading platform.

In order to facilitate the bundling of the papers, I have provided on the spool platform 10, adjacent each worker's position, a spool 31 of twine, the twine 32, from which may be drawn up through a suitable opening in the table top and drawn across the table to be adjacent the point where the workers stand in bundling up the papers. It is of course understood that the papers are counted out, depending upon the number going to each distributor, and are tied in bundles and marked and projected through the openings 29 to be subsequently conveyed by the belt to the wagon loading platform.

When use is to be made of the table without the necessity of putting the bundles through the openings 29, such, for instance, as using the end of the table for storage purposes, suitable doors are provided which are indicated by the numeral 33 for each of the openings 29, the doors being hinged as at 34 to the edge of the table top 5 and being arranged so that they can be swung to a closed position flush with the table top 5. In Figure 1, one of the doors 33 is shown closed while the other doors are shown open. When it is necessary to glue up the wrappers, such as in mailing the newspapers, I have facilitated this operation by providing in the under side of the table top 5, a glue pot or basin 35, the edges of which are flanged as at 36 and are received within a Z-shaped bar 37 at the sides thereof, the Z-shaped bar providing, in addition to a support for the glue basin, a runway for the lid or cover 38 which is slidable and held beneath the table top 5 and is provided with a handle or opening 39 whereby it may be opened conveniently by the operator.

It will be evident, therefore, that when the papers are delivered from the press, they will be conveyed directly by the chute leading from the press out upon the table 5 and, each of the employees will receive a number of papers which he will bundle up, depending upon the demands of the distributor, the papers being bundled either by the use of the twine or the glue, in the latter instance of course, wrappers being used for the purpose of mailing the papers and when the same are bundled, they will be shoved through the openings 29, will strike the apron 12 and will come to rest upon the conveyor belt 21, which, due to its continuous operation will convey the bundles out to the wagon loading platform, thus reducing the time for handling the papers and thereby making the operation of the delivery end of the plant more efficient with the resultant saving in cost to the plant operator.

I wish to call particular attention to the structural details of the apparatus whereby the cost of manufacture is materially reduced but providing a structure of a substantial design throughout. It will be noted that the cross members 28 rigidly ties the side frames of the table together and besides form a support for the conveying mechanism and associated parts, the mechanism and associated parts cooperating in a novel manner to provide a raceway for the bundles. It will also be noted that the side plates 26 perform the dual function of providing side walls for the conveying structure and an inclined apron for checking and directing the bundles on to the conveyor as they are passed through the openings. The shocks created in the dropping of the bundles on to the conveyor is effectively taken care of by the flooring which is in turn rigidly connected to the wall plates thereby binding the wall plates and cross members into a substantially unitary structure capable of withstanding all strains to which the apparatus is subject in the use thereof.

It will be evident that I have provided a combination bundling and delivery table which is of simplified construction and which eliminates the handling of bundles of papers, thereby saving the time of the employee and speeding up the delivery of the papers, which is an essential feature in newspaper offices.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A combination paper bundling and delivery table comprising a table top having spaced openings in the horizontal portion thereof and adjacent one side edge, hinged covers for said openings, a conveyor belt operable longitudinally of said table and in the lower part thereof, and a deflecting apron, extending downwardly from said top and arranged to guide bundles dropped through said openings to position on said conveyor belt.

2. In combination a table having a rectangular top in which is formed an aligned series of openings, a conveyor belt traveling under the table and an inclined apron common to all of said openings for checking gravitational action of articles passing through the openings and directing the same on to the conveyor belt.

3. In combination a bundle wrapping table having a series of openings formed in the top thereof each of a width less than the width of the table top, an individual door for each opening hinged to the edge portion of the table top to parallel the side of the table when in open position and to lie flush with the table top when in closed position, and conveying mechanism arranged in a plane below said openings.

4. In combination a bundle wrapping table having longitudinally extending series of openings formed in the top thereof each of a width less than the width of the table top, an individual door for each opening hinged to the table top to parallel the side of the table when in open position and to lie flush with the table top when in closed position, conveying mechanism arranged in a plane below said openings and means assuming an intermediate position between the conveying mechanism and the openings for checking and directing articles on to the conveyor mechanism as passed through said openings.

5. A paper bundling table comprising a top having aligned series of openings arranged in spaced relation, and a plurality of doors individual to each opening and hinged to the table top to hang vertically when in open position and lying flush with the table top when in closed position.

6. A newspaper bundling table comprising an elongated table having a series of individual openings formed within and spaced longitudinally of the top of said table, a conveyor traveling under all of said openings and extending a predetermined distance beyond one end of the table, and doors for selectively closing said openings and adapted to be supported by said table in flush relation with the work surface thereof.

7. A newspaper bundling table comprising an elongated horizontally disposed rectangular table having a longitudinally extending series of spaced individual rectangular openings, an elongated conveyor mounted to travel under and common to all of said openings, and a door for each opening hinged to the edge portion of the table to gravitate to a vertical open position, or to be moved to a horizontal position to close the opening, whereby the surface of the door may be utilized with the surface of the table for supporting articles or the door thrown to open position for allowing articles to be passed through the opening.

In testimony whereof I affix my signature.

HOWARD M. JAMPOL. [L. S.]